United States Patent [19]

Sapino, Jr. et al.

[11] 3,890,310

[45] June 17, 1975

[54] METHOXYMETHYL 3-METHYL-7-β-PHENOXYACETAMIDO-CEPH-3-EM-4-CARBOXYLATE

[75] Inventors: Chester Sapino, Jr., East Syracuse; Mariano Vecchio Ruggeri, Syracuse, both of N.Y.

[73] Assignee: Bristol-Myers Company, New York, N.Y.

[22] Filed: Mar. 8, 1974

[21] Appl. No.: 449,301

Related U.S. Application Data

[62] Division of Ser. No. 330,770, Feb. 8, 1973, Pat. No. 3,843,639.

[52] U.S. Cl. ............................ 260/243 C; 260/239.1
[51] Int. Cl. ............................................. C07d 99/24
[58] Field of Search ................................. 260/243 C

[56] References Cited
UNITED STATES PATENTS 3,578,660  5/1971  Cooper .......................... 260/243 C

*Primary Examiner*—Joseph A. Narcavage
*Attorney, Agent, or Firm*—Herbert W. Taylor, Jr.

[57] ABSTRACT

Cephalexin was produced by hydrolysis of its methoxymethyl ester which in turn was produced by reaction of 2-phenylglycine chloride hydrochloride with an imino ether of methoxymethyl 7-phenoxyacetamido-3-methyl-ceph-3-em-4-carboxylate which had been prepared by reaction of an alcohol with the corresponding imino-chloride made by treatment with $PCl_5$ of methoxymethyl 7-phenoxyacetamido-3-methylceph-3-em-4-carboxylate. The last was made by thermal rearrangement of the methoxymethyl ester of phenoxymethylpenicillin sulfoxide.

1 Claim, No Drawings

METHOXYMETHYL 3-METHYL-7-β-PHENOXYACETAMIDO-CEPH-3-EM-4-CARBOXYLATE

CROSS-REFERENCE TO RELATED APPLICATION

This application is a division of our prior, copending application Ser. No. 330,770 filed Feb. 8, 1973, Pat. No. 3,843,639.

BACKGROUNDD OF THE INVENTION

1. Field of the Invention

The compound produced by the chemical processes of the present invention is cephalexin, which is an antibacterial agent of the class commonly called cephalosporins.

2. Description of the Prior Art

Scientists of Toyo Jozo Kabushiki Kaisha appear to have been the first to prepare one pencillin from another by the chemical route which has been called "transacylation" or, more casually, "the switch reaction". In this synthesis a readily available, natural penicillin is converted to a chloro-imide or imino-ether (prepared according to Gist U.S. Pat. Nos. 3,499,909 and 3,676,429) which is then acylated to produce the N,N-diacyl 6-aminopenicillanic acid (as an easily hydrolyzed ester to protect the carboxyl group) from which the orginal acyl group of the starting penicillin is then removed along with the esterifying group, as by reaction with a nucleophile such as sodium thiophenolate, preferably in dimethylformamide. Such reactions were described in U.S. Pat Nos. 3,594,367; 3,658,792 and 3,668,200 and in Farmdoc 14,183R, 48,229S and 50,298S. Scientists of Yamanouchi Pharmaceutical Company, Ltd. have made related disclosures in patents abstracted as Farmdoc 08,653S, 40,65T, 47,171T and 47,172T and in Yakugaku Zasshi 92(4), 454–458 and 459–464 (1972) which discloses the use of two particular esters of benzylpenicillin to make ampicillin.

Cephalexin is an antibacterial agent used in human therapy and marketed as the monohydrate of the free acid (i.e., the zwitterion). It is described, for example, in J. Med. Chem. 12, 310–313 (1969), J. Org. Chem. 36(9), 1259–1267 (1972) [See Belgium Pat. No. 765,596: Farmdoc 67,511S] and in U.S. Pat. No. 3,507,861, U.K. Pat. No. 1,174,335 and Canada Pat. No. 856,786.

There are numerous disclosures of alternative methods for the production and purification of cephalexin (as the free acid). Examples include U.S. Pat. Nos. 3,634,416; 3,668,201; 3,668,202; 3,671,449 (Example 3); 3,676,434; 3,676,437; 3,689,483; 3,694,437; 3,714,146; U.K. Pat. No. 1,227,014 and Belgium Pat. No. 768,306 (Farmdoc 80,093S) and by my colleagues J. Rubinfeld, R.U. Lemieux and R. Raap and U.S. application Ser. No. 143,683 filed May 11, 1971 (corresponding to Germany Off. No. 2,222,953 and Japan Publ. No. 42795/1972) and U.K. Pat. No. 1,270,633.

Various disclosures with regard to crystalline forms and hydrates of cephalexin are given, for example, by Pfeiffer et al., in Journal of Pharmaceutical Sciences, 59(12), 1809-1814 (1970), by Bond et al. in Pharmaceutical Journal, 210-214 (August 22, 1970), in U.S. Pat. Nos. 3,502,663; 3,531,481; 3,665,656 and 3,692,781, in Belgium Pat. No. 753,910 (Farmdoc 8,214S) and Belgium Pat. No. 777,789 (Farmdoc 48,556T) and in France Pat. No. 2,096,117.

The application of this "transacylation" process to cephalosporins developed more slowly and was complicated by the additional functional groups found in the only such compound produced (until recently) by fermentation, that is, cephalosporin C. Fujisawa Parmaceutical Company, Ltd. reported in Belgium Pat. No. 758,587 (Farmdoc 34,689S) its application to certain 3-thiolated derivatives of cephalosporin C using chloro-imides and imino-ethers of the general type described, for example, in U.S. Pat. Nos. 3,575,970 (Gist), 3,697,515 (Ciba) and 3,573,295 and 3,573,296 (Bristol-Myers). Yamanouchi used this process on certain particular esters of 7-phenoxyacetamido-3-methylceph-3-em-4-carboxylic acid in France Pat. No. 2,096,117 (Farmdoc 80,093S; Belgium Pat. No. 768,306) to produce cephalexin.

SUMMARY OF THE INVENTION

This invention comprises the useful intermediate methoxymethyl 3-methyl-7-β-phenoxyacetamido-ceph-3-em-4-carboxylate and the process for the preparation of cephalexin which comprises the consecutive steps (which can be advantageously conducted in a single vessel) of a. reacting methoxymethyl 3-methyl-7-β-phenoxyacetamido-ceph-3-em-4-carboxylate in an anhydrous, inert water-immiscible solvent preferably selected from the group consisting of methylene chloride, dichloroethane, chloroform, tetrachloroethane, nitromethane and diethyl ether in the presence of an acid deactivating tertiary amine preferably selected from the group consisting of trietylamine, trimethylamine, dimethylaniline, quinoline, lutidine and pyridine with at least an equimolar amount of a halogenating agent preferably selected from the group consisting of phosphorus pentachloride, phosphorus pentabromide, phosphorus trichloride, phosphorus tribromide, oxalyl chloride, p-toluenesulfonyl halide, phosphorus oxychloride and phosgene at a temperature in the range of −10° C. to −60° C. and preferably below −15° C., b. mixing therewith an aliphatic alcohol of less than seven carbons, preferably methanol, while maintaining the temperature in the range of −20° C. to −70° C. and preferably below −30° C., c. mixing therewith in portions at least an equimolar amount of D-(-)-2-phenylglycyl chloride hydrochloride below −30° C. and d. mixing therewith water and a mineral acid, preferably sulfuric acid or hydrochloric acid, preferably below 10° C. to produce said cephalexin in the acidic, aqueous phase.

DETAILED DESCRIPTION OF THE INVENTION

This invention provides a convenient synthetic route for the preparation of cephalexin from the methoxymethyl ester of 3-desacetoxycephalosporin V which in turn is prepared by ring expansion of penicillin V methoxymethyl ester sulfoxide (as described below) or directly from 3-desacetoxycephalosporin V acid and chloromethyl methyl ether (as described below). This ester is also a useful intermediate for subsequent conversion by known side chain cleavage routes into 7-amino-3-desacetoxycephalosporanic acid (7-ADCA). Our new process renders unnecessary the preparation of 7-ADCA and enables one to simply exchange acyl group sidechains under essentially anhydrous conditions in good yield utilizing only one reaction vessel.

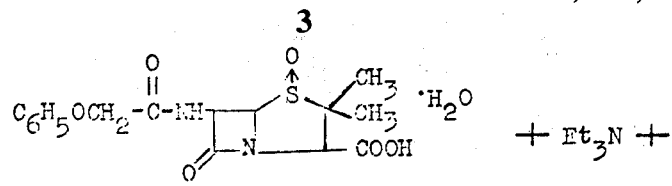
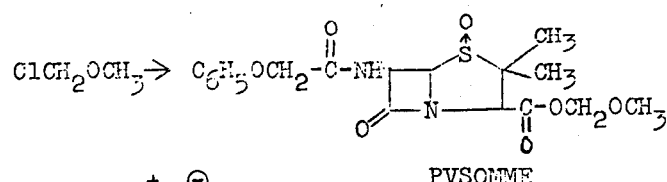
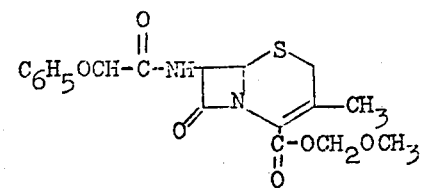
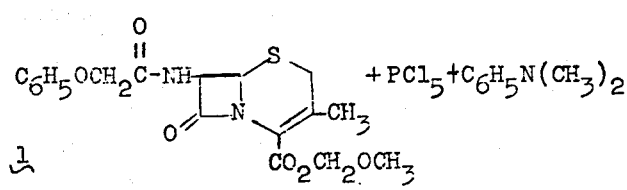
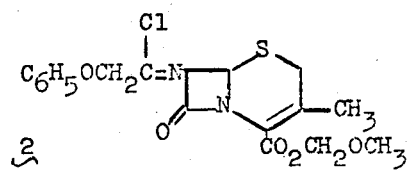
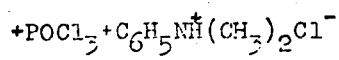
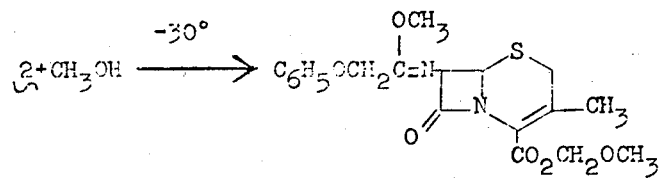
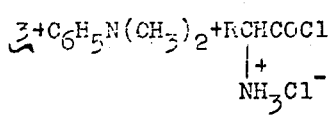

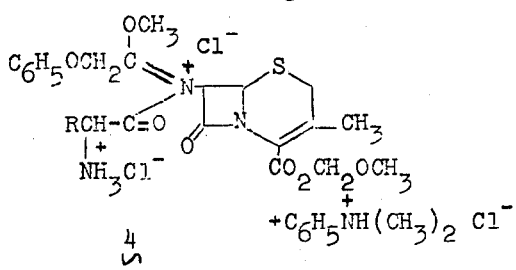

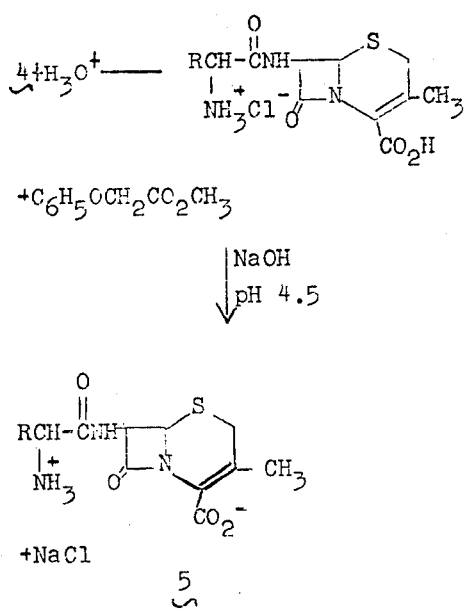

R — represents phenyl.

The treatment of the methoxymethyl ester (1) with phosphorous pentachloride in methylene chloride solution at −20° C., in the presence of N,N-dimethylaniline gave rise to the imidoyl chloride 2. This intermediate was sufficiently stable that the reaction could easily be followed to completion by thin layer chromatography. Furthermore, in an analogous reaction sequence, using phosphorous pentachloride in the presence of d₅-pyridine in deuterochloroform solution at 25°, it was possible to characterize this intermediate fully by the use of NMR techniques. An NMR spectrum of the chlorination mixture in deuterochloroform, after 1 hour, revealed that the six line pattern between 5 and 6.3 ppm. (β-lactam; $C_6$, $C_7$ hydrogen atoms, coupled to amide NH), initially present in the ester, was transformed into a well resolved pair of AB doublets (J=4.5 Hz), characteristic of the chloroimide. Furthermore, there was a downfield shift of the sidechain $PhOCH_2$ signal from δ4.70 ppm. to δ4.80 ppm., indicative of substitution of chlorine for oxygen at the amide carbonyl group. These data clearly indicate the absence of any amide NH signal, which is generally submerged under the aromatic region center at δ7.0 ppm. Finally, integration of the aromatic region revealed detection of only five protons due to $C_6H_5O$, clearly showing the absence of amide NH signal. Peaks at δ3.45 ppm. ($CH_3O$) and δ5.70 ppm. ($CH_3OCH_2$) showed that the ester linkage was intact, and peaks at δ2.10 ppm. ($CH_2$ ) and 3.25 ppm ($S-CH_2$) were indicative of the dihydrothiazine moiety.

The chlorination mixture in methylene chloride solution was treated with excess methanol at −20° to −30°. After 2 hours, the complete disappearance of the chloroimide was observed by thin layer chromatography. The resulting imino-ether (3) was acylated with D—(−)— α-phenylglycyl chloride hydrochloride at −20° to −+°, giving rise to presumed intermediate 4. The acylation mixture was subsequently hydrolyzed in acidic water after ca. 2 hours, giving high quality cephalexin as a solid after pH adjustment in 1-butanol/water to pH 4.5.

The structure of the cephalexin so produced was confirmed by elemental analysis, infrared, nuclear magnetic resonance and ultraviolet spectral techniques, as well as TLC comparison with an authentic sample. Biopotency data indicated that the product was greater than 90% pure. Slightly lower quality cephalexin obtained during our preliminary investigations was readily recrystallized to analytically pure relatively water-insoluble monohydrate by pH adjustment in 1-butanol/water at 25° in 70% recovery.

This invention is illustrated by the following examples, but it is to be understood that these examples are given by way of illustration and not of limitation. All temperatures are given in degrees Centigrade.

DESCRIPTION OF THE PREFERRED EMBODIMENTS

EXAMPLE 1

Conversion of Penicillin V to Desacetoxy - cephalosporin V via ring expansion of Pen V sulfoxide methoxymethyl ester Preparation of Pen V Sulfoxide METHOXYMETHYL Ester Methoxymethyl which is also named as methoxymethyl 6-phenoxyacetamido-penicillinate sulfoxide)

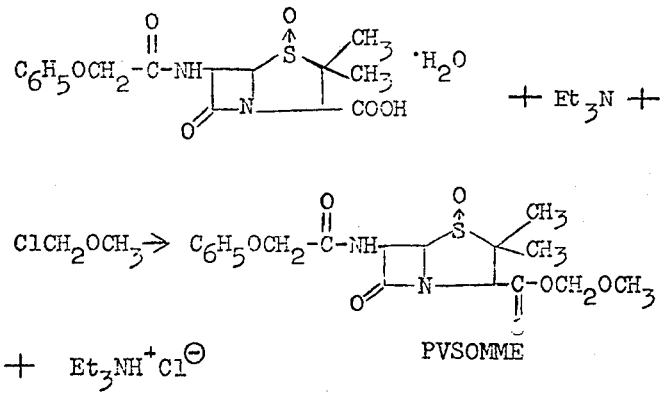

To 109.8 g. (0.285 mole) of penicillin V sulfoxide monohydrate (U.S. Pat. No.. 3,544,581) slurried in 500 ml. of triethylamine followed by sufficient (Linde Type 4A) molecular sieves to take up the water of hydration. After stirring 20 min. 30 ml. of chloromethyl methyl ether was added and the mixture stirred at 0°–5° for 2 hr. The molecular sieves were removed by filtration and the solution was washed with two 100 ml. portions of cold water. The organic layer was concentrated under reduced pressure to about 300 ml. and diluted to 1000 ml. with n-heptane. This gave a precipitate. The slurry was stirred 2 hr. at 0°– °, filtered and the resulting yellow solid redissolved in 500 ml. of 2-propanol at 40°–50° for 3 hr. The resulting solid was filtered, washed with 600 ml. of 50/50 2-propanol/heptane and dried at 35° for 18 hrs. There was obtained 107 g. (93% yield) of white, crystalline PVSOMME showing one zone on thin layer chromatography, with m.p. 113.5°–114.5° and having infrared and NMR spectra clean and consistent for that structure.

Ring Expansion of Pen V sulfoxide methoxymethyl ester (PVSOMME) to the methoxymethyl ester of desacetoxyceph V (DACVMME; which is also named as methoxymethyl 7-phenoxyacetamido-3-methylceph-3-em-4-carboxylate).

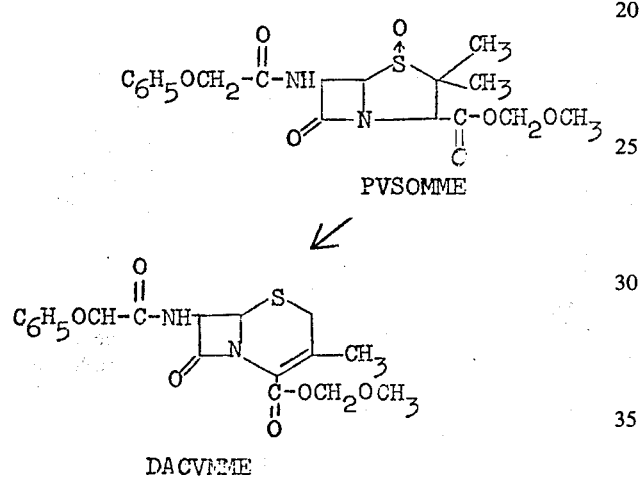

PVSOMME

DACVMME

Run No. 1

To 200 ml. of dioxane was added 20 gm. (0.050 mole) of PVSOMME, 10 g. of crushed (Linde type 4A) molecular sieves and 2.5 g. of the solid pyridine salt of p-toluenesulfonic acid. With stirring the mixture was heated to the reflux temperature for 5 hours. After cooling and filtering, the mixture was concentrated under reduced pressure to an oil and taken up in 400 ml. dichloromethane. This solution was washed with three 200 ml. portions of water, carbon treated filtered and the filtrate dried and then concentrated under reduced pressure to give 15 g. of a foamy solid. Thin layer chromatography showed the methoxymethyl ester of desacetoxy-ceph V (DACVMME) as the predominant product with a substantial amount of decarboxylated material and a trace of unchanged PVSOMME. This solid when subjected to cleavage conditions gave 7-ADCA assaying 72% pure by chemical assay in 32% yield.

Run No. 2

The conditions of example 1 were repeated using 2 g. of pyridine tosylate salt and 4 hr. reaction time. After filtering and stripping, the methylene chloride solution was washed with 100 ml. of water, 100 ml. of pH 7 buffer solution, and 100 ml. of water. The dried organic solution on stripping gave 18 g. of yellow foamy solid. TLC showed about 65% DACVMME. A 100 mg. sample was dissolved in 10 ml. of 50/50 acetone and pH 7 buffer solution and showed a potency of 6100 mcg./ml. in a DACV biological assay.

A 2 g. sample of this foamy solid was dissolved in 60 ml. of dichloromethane at 25° and treated 30 min. with 1 g. of meta-chloroperoxybenzoic acid. The solution was washed with 30 ml. of water and 30 ml. of pH 7 buffer solution. The organic layer was dried, concentrated to an oil and the oil triturated with ether containing acetone. The resulting crystalline solid was filtered and dried to give 1.1 g. (52% yield) of desacetoxycephalosporin V sulfoxide methoxymethyl ester identical in all respects with authentic material.

RUN No. 3

In a manner similar to the previous examples, 5 g. of PVSOMME, 50 ml. of dioxane, 7.5 g. of molecular sieves and 0.5 g. of pyridine salt of methanesulfonic acid was heated to reflux for 2 hrs. After filtering and stripping, the resulting oil was taken up in 50 ml. dichloromethane. This solution was washed twice with 30 ml. pH 7 buffer solution followed by 30 ml. cold water, carbon treated, dried and stripped to give 3.5 g. of light yellow foamy solid. On cleaving there was obtained 0.75 g. of 7-ADCA (27% yield) assaying 870 mcg./mg. by chemical assay.

Run No. 4

To 10 g. of PVSOMME in 100 ml. of 1,2-dichloroethane was added 0.25 g. of pyridine tosylate and the mixture held at reflux temperature for 12 hours. TLC showed incomplete reaction. An additional 0.5 g. of catalyst was added and reflux continued for 4 hours. After cooling, the mixture was washed twice with 50 ml. of cold, acid (pH 1.5) water. The organic layer was dried and passed over a 1 × 60 cm. column of silica gel and the column eluted with 1250 ml. of dichloromethane. Appropriate fractions of the eluate were combined and stripped to give 2.0 g. (21%) of foamy solid identical with DACVMME.

Run No. 5

The ring expansion was carried out on 5 g. PVSOMME in 50 ml. dioxane with 10 g. of crushed molecular sieves and 0.5 g. of pyridine tosylate at the reflux temp. for 18 hrs. After cooling and filtering 20 ml. of 6N HCl solution was added and the mixture held at about 25° approximately 1–2hours to hydrolyze the methoxymethyl ester group. The mixture was then diluted with 50 ml. of water, extracted 3 times with 50 ml. of dichloromethane and the combined dichloromethane solution extracted three times with 50 ml. of pH 7 buffer solution. The combined buffer extracts were adjusted to pH 1.5 with HCl and extracted three times with 30 ml. of ethyl acetate. The combined ethyl acetate layers were stripped to give a foamy solid which was taken up in 30 ml. of methanol and treated with dibenzylamine. After crystallizing 15 hrs. at 0°, there was obtained 2.6 g. (48% yield) of the dibenzylamine salt of DACV identical with an authentic sample.

Methoxymethyl 3-methyl-7-β-Phenoxyacetamidoceph-3-Em-4-Carboxylate

A suspension of 3-methyl-7-β-phenoxyacetamido-ceph-3-em-4-carboxylic acid (20.0 g., 57.4 mmoles) (Netherlands 72/06193; Farmdoc 76,350T) in dry methylene chloride (300 ml.) was cooled to 0°–5° and treated with triethylamine (7.96 ml., 5.80 g., 57.5 mmoles) in one portions under nitrogen. The resulting solution was then treated with chloromethyl methyl ether (5.0 ml., 5.03 g., 62.5 mmoles) over a 15 minute period, with high speed stirring at 0°–5°. The mixture was stirred for an additional 2.0 hours at 0°–5°. At this point, TLC on silica gel F 254, 250 μ; system 4 acetone/12 benzene/1 HOAc revealed the absence of any starting acid at $R_f$ 0.5, and the presence of the ester at $R_f$ 0.75, when visualized with 1% potassium permanganate. The mixture was washed with 0°–5° water (100 ml.), followed by 0°–5° pH 7.00 phosphate buffer (100 ml.), dried over anhydrous sodium sulfate, and concentrated to an oil in vacuo at 20°–25°. The oil was dissolved in isopropanol (300 ml.) at 25°, and seed crystals were added. The mixture was cooled to 0°–5° and during the cooling period, the ester crystallized. The slurry was held at 0°–5° for 4 hours, filtered, and the colorless cake displacement washed with 1:1 isopropanol/heptane (100 ml.). The colorless product was oven dried to constant weight at 40° giving 21.4 g. (95%) of colorless rods of the title compound: m.p. 106°–107°; $[\alpha]_D^{25°}$ + 107° (c 1, in methanol); $\lambda_{max}^{CH_3OH}$ nm(logε) 215$^{sh}$(3.41), 255(3.12), 260$^{sh}$(3.15), 267(3.16), 274(3.12); TLC, silica gel F 254, 250 u, title compound $R_f$ 0.75 (1% KMnO$_4$); IR 1800 (β-lactam C=O), 1718 (amide C=O), 3315 (NH) cm$^{-1}$ in KBr; NMR (CDCl$_3$) δ 2.20(s,3, C$\underline{H}_3$-≮), δ3.42 (2d, 2, J=18 Hz, S—C$\underline{H}_2$), δ 3.45(s, 3, OC$\underline{H}_3$), δ4.60)s, 2, PhOC$\underline{H}_2$), δ5.05 (d, 1, C$_6$ β-lactam, J=5Hz), δ5.40 (s, 2, CH$_3$OC$\underline{H}_2$), δ5.89(d, 1, C$_7$β-lactam, J=5Hz), 5.89(d, 1, C$_7$-lactam coupled with N$\underline{H}$, J=15Hz), δ7.2(m, 6, C$_6$$\underline{H}_5$, N$\underline{H}$).

Anal. Calcd for C$_{18}$H$_{20}$N$_2$O$_6$S: C, 55.08; H, 5.13; N, 7.14; S, 8.17. Found: C, 54.68; H, 5.24; N, 7.07; S, 8.29.

3-Methyl-7-β-[D-2-Amino-2-Phenylacetamido]-Ceph-3-Em-4-Carboxylate (Cephalexin)

Methoxymethyl 3-methyl-7-β-phenoxyacetamidoceph3-em-4-carboxylate (10.0 g., 25.4 mmoles) dissolved in dry methylene chloride (100 ml.) was cooled to −50°. N,N-Dimethylaniline (7.45 ml., 7.15 g., 59.0 mmoles) was added, followed by the addition of phosphorous pentachloride (6.20 g., 29.77 mmoles) with high speed stirring. The mixture was brought to −30° to −35° and held at this temperature for 2 hours. At this point, thin layer chromatography on silica gel F 254, 250 μ; system — 75 benzene/25 ethyl acetate showed the presence of the chloroimide at $R_f$ 0.8, and the absence of the starting material ($R_f$ 0.5), when visualized with 1% potassium permanganate. The chlorination mixture was cooled to −50° and treated in one portion with −30° precooled dry methanol (30 ml., 23.7 g., 0.74 mole). The clear, light yellow solution was allowed to come to −35° and held at this temperature for 2 hours. At this point, thin layer chromatography in the above system revealed the complete disappearance of the chloroimide at $R_f$ 0.8. At −35°, N,N-dimethylaniline (12.0 ml., 11.52 g., 95.07 mmole) was added and the mixture brought to −30° . D-(−)-α-phenylglycylchloride hydrochloride (5.8 g., 28.15 mmoles) was added portion-wise over a 0.5 hour period at −30° with high speed stirring. Complete solution was evident within 5 minutes after the addition of acid chloride. The acylation mixture was held for 1 hour at −30° and gradually warmed to 0° over a 0.5 hour period. Water (20 ml.) at 0°–5° was added with high speed stirring. The pH initially at 2.5 gradually dropped to 1.3–1.5 after 10 min. hydrolysis time. The pH was then adjusted to 0.3–0.5 with 6 N hydrochloric acid and allowed to proceed at 0°–5° for 3 hours. At this point, thin layer chromatography on silica gel GF 254, 250 μ; system - 50 acetone/15 benzene/10 HOAc/15 H$_2$O, visualized with 1% potassium permanganate revealed the presence of cephalexin at $R_f$ 0.8. The layers were separated and the aqueous layered with an equal volume of 1-butanol. The mixture was adjusted to pH 4.5 with 30% aqueous sodium hydroxide at 0°–5°, and the mixture seeded immediately with cephalexin monohydrate. The mixture crystallized within 1 min. The slurry was held at 25° for 2 hours whereby the crystal structure changed from fine needles to large parallelograms. The mixture was cooled to 0°–5° and held for 16 hours at pH 4.5. The product was collected, washed with cold water/1-butanol, followed by 1-butanol. The colorless product was oven -dried at 40° to constant weight giving 3.5 g. (38%) of cephalexin monohydrate: TLC, silica gel F 254, 250 μ, title compound at $R_f$ 0.8, system-50 acetone/10HOAc/15H$_2$O (1% KMnO$_4$), no other zones visible; $[\alpha]_D^{25°}$ + 125.6° (C 1, water);- $\lambda_{max}^{H_2O}$ nm(log ε) 260(3.83), 210(3.97); biopotency 888 μg/mg; IR 1770 (β-lactam C=O), 1690 amide C=O), 1580 (CO$_2$$^-$) cm$^{-1}$; NMR (D$_2$O/d$_6$-DMSO/DCl) δ2.09 (S, 3, C$\underline{H}_3$-≮ ),δ3.40(2d, 2, J=18 Hz, S-CH$_2$) δ5.05 (d, 1, J-5HZ, C$_6$β-lactam),δ5.25(d, 2, J-5Hz, C$_7$β-lactam),δ7.55 (S, 5, C$_6$$\underline{H}_5$).

Anal. Calcd for C$_{16}$H$_{17}$N$_3$O$_4$S·H$_2$O: C, 52.59; H, 5.24; N, 11.50; S, 8.73; KF, 4.93.

Found: C, 52.49; H, 5.17; N, 10.96; S, 8.73; KF, 5.62.

Recrystallization of Cephalexin Monohydrate

Cephalexin monohydrate (1.0 g.) was dissolved in 1:1 water/1-butanol by adjusting the pH to 1.0 with 6 N hydrochloric acid at 25°. The mixture was warmed to 35°–40° and slowly adjusted to pH 4.5 with 10% aqueous sodium hydroxide with seeding at pH 3.0. The mixture was crystallized for 30 min. at 35° and cooled to 25° over a 45 min. period and held at this temperature for 1 hr. The slurry was cooled to 0°–5° and held at this temperature for 16 hours. The product was collected, washed with 0°–5° 1:1 water/1-butanol, 1-butanol and oven dried to constant weight at 40° giving 700 mg. (70% recovery), identical in all respects with that obtained in the acylation sequence above. The biopotency ranged between 915 ug/mg and 1065 ug/mg.

EXAMPLE 2

3-Methyl-7-β-[D-2-amino-2-phenylacetamido]ceph-3-em-4-carboxylate (cephalexin).

Methoxymethyl-3-methyl-7-β-phenoxyacetamidoceph-3-em-4-carboxylate (5.0 g., 12.7 mmoles) was dissolved in dry methylene chloride (50 ml.) and cooled to −50°. N,N-Dimethylaniline (3.72 ml., 3.58 g., 29.5 mmoles) was added and the mixture treated with phosphorous pentachloride (3.1 g., 14.9 mmoles). The mixture was held at −30° to −35° for 2 hours and cooled to −60°. The mixture was treated in one portion with dry, precooled (−60°) methanol (20 ml., 15.8 g., 0.49 mole) and the mixture brought to −35° to −40°. After 2 hours at this temperature, N,N-dimethylaniline (6.0 ml., 5.76 g., 47.53 mmoles) was added, followed by the portionwise addition of D-(−)-α-phenylglycyl chloride hydrochloride (2.9 g., 14.08 mmoles) over a 0.5 hour period. The mixture was held at −35° for 1 hour, water (30 ml.) was added, and the mixture stirred at 0°–5° for 10 min., and 1 hour at 25°. The layers were separated and the aqueous concentrated to ca. 15–18 ml. Acetonitrile (20 ml.) was added, and the pH adjusted to 4.5–5.0 with 20% aqueous sodium hydroxide at 0°–5°. Cephalexin began to crystallize within 1 minute. The slurry was held at 0°–5° for 6 hours, the product collected, washed with water, and acetonitrile and oven dried at 40° giving 1.75 g. (38%) of pale yellow cephalexin: TLC; silica gel F 254, 250 $\mu$, title compound $R_f$ 0.80, system — 50 acetone/15 benzene/10 HOAc/15 $H_2O$ (1% $KMnO_4$), no other zones were visible; NMR (60 MHz), showed traces of acetonitrile. The above product was recrystallized by pH adjustment in 1-butanol/water as described previously in 69% recovery which was identical in all respects with that obtained previously.

EXAMPLE 3

3-Methyl-7-$\beta$-[D-2-amino-2-phenylacetamido]-ceph-3-em-4-carboxylate (cephalexin)

Methoxymethyl 3-methyl-7-$\beta$-phenoxyacetamidoceph-3-em-4-carboxylate (10.0 g., 25.4 mmoles) dissolved in dry methylene chloride (100 ml.) was cooled to −20° N,N-dimethylaniline (7.45 ml., 7.15 g., 59.0 mmoles) was added followed by the addition of phosphorous pentachloride (6.20 g., 29.77 mmoles) with high speed stirring. The mixture was held at −20° for 2 hours, and treated with precooled (−30°) methanol (30 ml., 23.7 g., 0.74 mole). The mixture was brought to −20° and held for 2 hours at this temperature. D-(−)-$\alpha$-Phenylglycylchloride hydrochloride (5.8 g., 28.15 mmoles) was added portionwise over a 0.5 hour period at −20° with high speed stirring. The acylation was allowed to proceed for 1 hour at −20° and gradually brought to 0° over a 1 hour period. Water (20 ml.) was added and the mixture brought to 25°. The pH initially at 2.5 dropped to 1.8 after 10–15 min. hydrolysis time. The pH was then adjusted to 0.2 with 6 N HCl and the mixture stirred at 25° for 3 hours. The layers were separated and the aqueous layered with an equal volume of 1-butanol. The mixture was adjusted to pH 4.5 over a 30 min. period with seeding at pH 3.0. The mixture crystallized within 2 minutes at pH 4. The slurry was allowed to crystallize at 25° for 2 hours and then cooled to 0°–5° and held for 16 hours. The product was collected and washed with 1:1 water/1-butanol, butanol, isopropanol, and oven dried at 40°–45° giving 3.70 g. (40.0%) of the title compound which was identical in all respects with that obtained earlier. A second crop of slightly less pure cephalexin was obtained by evaporation of the mother liquor above and cooling for 3 hours at 0°–5° giving 1.20 g. (13%) for a total yield of 53%.

IR data were obtained on a Beckmann IR9. NMR spectra were recorded on a Perkin Elmer R12-B operating at 60MHz with probe temperature at ca. 40°. NMR data are given in units relative to tetramethylsilane. U.V data were obtained on a Beckmann Acta 3. Rotation data given were obtained at 25° on a Perkin Elmer PE141 recording polarimeter. The superscript[SH] refers to a shoulder on the UV curve. Bioassay data were obtained by turbidimetric methods using S. Aureus 209P.

We claim:

1. Methoxymethyl 3-methyl-7-$\beta$-phenoxyacetamidoceph-3-em-4-carboxylate.

* * * * *